United States Patent [19]

Takahashi

[11] Patent Number: 5,896,840
[45] Date of Patent: Apr. 27, 1999

[54] COMBUSTION CONTROLLER FOR INTERNAL COMBUSTION ENGINES

[75] Inventor: Jun Takahashi, Toyota, Japan

[73] Assignee: Toyota Jidosha Kabushiki Kaisha, Toyota, Japan

[21] Appl. No.: 08/994,021

[22] Filed: Dec. 18, 1997

[30] Foreign Application Priority Data

Dec. 19, 1996  [JP]  Japan ................... 8-339783

[51] Int. Cl.$^6$ ................................... F02B 17/00
[52] U.S. Cl. ................................... 123/295
[58] Field of Search ........................ 123/295, 430, 123/480

[56] References Cited

U.S. PATENT DOCUMENTS

| | | | |
|---|---|---|---|
| 3,956,986 | 5/1976 | Wirz ........................... | 101/350.1 |
| 4,955,339 | 9/1990 | Sasaki et al. ................ | 123/295 |
| 5,078,107 | 1/1992 | Morikawa .................... | 123/295 |
| 5,189,960 | 3/1993 | Valentini, et al. ........... | 101/216 |
| 5,215,053 | 6/1993 | Ito ............................... | 123/276 |
| 5,331,933 | 7/1994 | Matsushita ................... | 123/295 |
| 5,657,637 | 8/1997 | Mertens ....................... | 62/175 |
| 5,720,221 | 2/1998 | Harig, et al. ................. | 101/148 |
| 5,722,362 | 3/1998 | Takano et al. ............... | 123/298 |

FOREIGN PATENT DOCUMENTS 5-52145  3/1993  Japan.

*Primary Examiner*—Andrew M. Dollnar
*Assistant Examiner*—Arnold Castro
*Attorney, Agent, or Firm*—Oliff & Berridge, PLC

[57] ABSTRACT

An engine operates in a stratified charge combustion mode and a homogeneous charge combustion mode. A sensor detects driving state of the engine. An ECU (electronic control unit) computes a basic amount of the fuel to be injected from a nozzle based on the detected driving state of the engine. The ECU switches the combustion mode based on the computed basic amount. The ECU computes a corrected amount of the injection fuel based on the basic amount of the injection fuel. The corrected amount of the injection fuel suppresses a fluctuation of engine torque caused by switching of the combustion mode. The ECU controls the injection valve based on the computed corrected amount.

16 Claims, 5 Drawing Sheets

COMBUSTION CONTROLLER FOR INTERNAL COMBUSTION ENGINES

BACKGROUND OF THE INVENTION

The present invention relates to combustion controllers for internal combustion engines that shift combustion modes in accordance with the operating conditions of the engine.

In a typical automotive engine, fuel is injected into an intake port by a fuel injector to charge the associated combustion chamber with a homogeneous mixture of fuel and air. An air intake passage is opened and closed by a throttle valve, which is operated in cooperation with an acceleration pedal. The opening of the throttle valve adjusts the intake air amount (and ultimately the amount of homogeneously mixed air and fuel) that is supplied to the combustion chambers of the engine. This controls engine power.

The combustion of the air fuel mixture in such homogeneous state is normally referred to as homogeneous charge combustion. However, in engines that perform homogeneous combustion, the throttling action of the throttle valve decreases the pressure in the intake passage. This increases energy loss due to pumping (pumping loss) when the air fuel mixture is drawn into the combustion chambers from the intake passage and thus decreases the efficiency of the engine. This problem can be dealt with by direct injection. In an engine that performs direct injection, the throttle valve is opened wide and fuel is injected directly into each combustion chamber. The air drawn into each combustion chamber is swirled and mixed with atomized fuel to form a stratum of a stoichiometric air-fuel mixture near the spark plug. Such stratified charge combustion increases the overall air-fuel ratio of the mixture that is burned. This improves fuel efficiency.

Stratified charge combustion is the optimal combustion mode if the engine is in a low speed range or intermediate speed range, and the amount of fuel injection is thus small. In comparison, homogeneous charge combustion is the optimal combustion mode if the engine is in a high speed range, and the amount of fuel injection is thus great. Therefore, it is beneficial for an engine to perform both stratified charge combustion and homogeneous charge combustion.

Japanese Unexamined Patent Publication No. 5-52145 describes an engine that shifts combustion modes (or fuel injection modes) between stratified charge combustion, homogeneous charge combustion, and semi-stratified charge combustion. Stratified charge combustion is performed when the load applied to the engine is light. In this mode, fuel is injected during the compression stroke. If a heavy load is applied to the engine, homogeneous charge combustion is performed. In this mode, fuel is injected during the intake stroke. If an intermediate load is applied to the engine, semi-stratified charge combustion is performed. In this mode, fuel is injected twice, once during the intake stroke and once during the compression stroke.

The shifting of the combustion mode, or the fuel injection mode, results in certain problems. For example, when the combustion mode is shifted from stratified charge combustion to homogeneous charge combustion, the amount of fuel injection is increased. Furthermore, the intake air is throttled by the throttle valve. This results in energy loss (pumping loss) and decreases the engine torque in a sudden manner. It is preferable for the torque to increase gradually as the engine load increases. However, if the fuel injection is determined in accordance with changes in the engine load without taking pumping losses into consideration, sudden torque fluctuations will occur when switching the combustion mode.

SUMMARY OF THE INVENTION

Accordingly, it an objective of the present invention to provide a engine combustion mode controller that suppresses torque fluctuations produced when shifting combustion modes (fuel injection modes).

To achieve the above objective, the present invention provides an apparatus for controlling fuel injection according to a combustion mode of an engine selected from a combustion mode group including a stratified charge combustion mode and a homogeneous charge combustion mode. The apparatus includes a nozzle for injecting fuel to an engine. A detecting means detects the driving state of the engine. A first computing means computes a basic amount of the injection fuel that is injected from the nozzle based on the detected driving state of the engine. A switching means switches the combustion mode based on the computed basic amount. A second computing means computes a corrected amount of the injection fuel based on the basic amount of the injection fuel. The corrected amount of the injection fuel suppresses a fluctuation of engine torque caused by switching of the combustion mode. A controlling means controls the nozzle based on the corrected amount of the injection fuel in synchronism with switching of the combustion mode.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

A combustion mode controller for an automotive engine will now be described with reference to the drawings.

Figure 1:
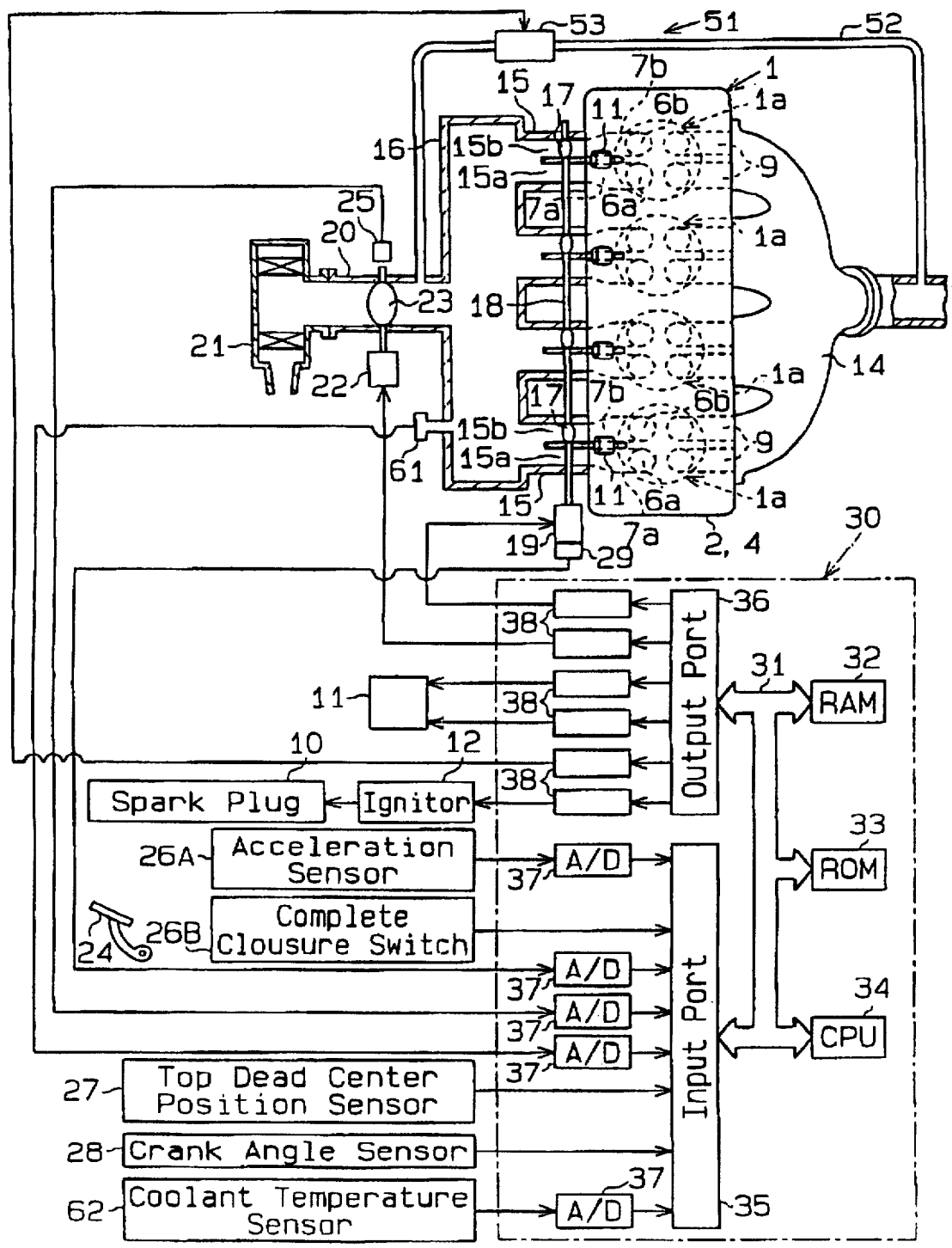
FIG. 1 is a schematic view and block diagram showing a combustion mode controller according to the present invention.
Figure 2:
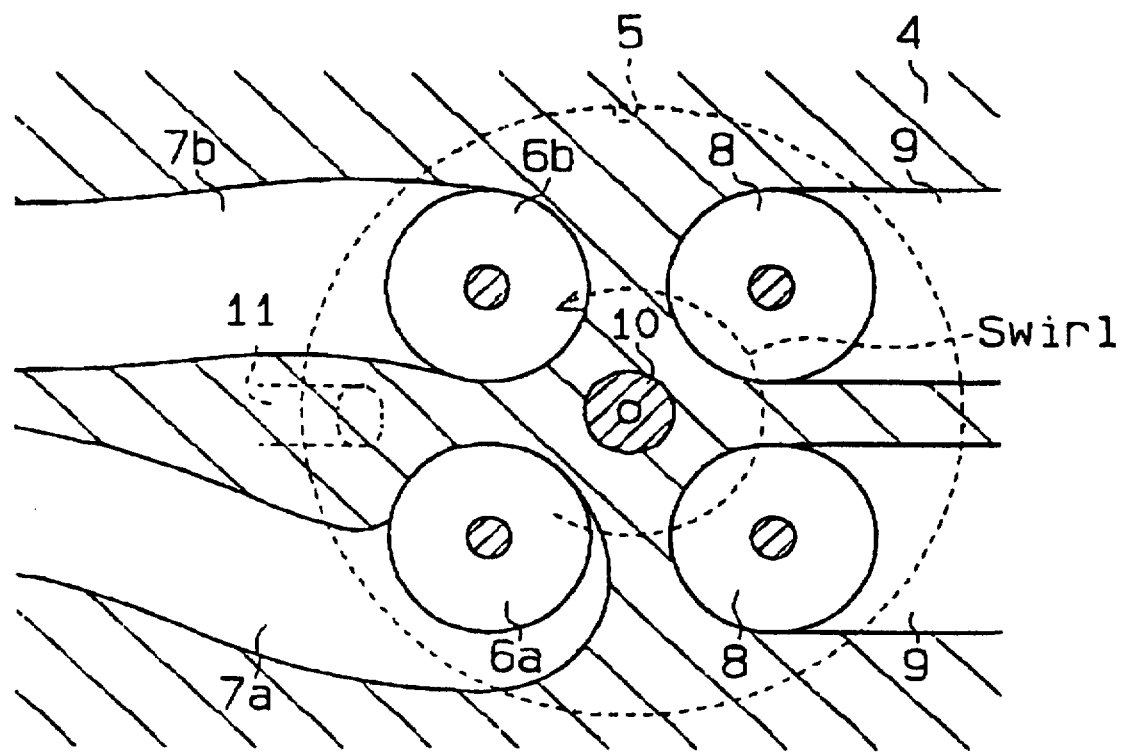
FIG. 2 is an enlarged schematic cross-sectional view showing a cylinder of the engine of FIG. 1.

FIG. 1 is a schematic view showing a combustion control apparatus of an automotive engine that injects fuel directly into its cylinders (direct injection type engine). An engine 1 has, for example, four cylinders 1a. The structure of the combustion chamber of each cylinder 1a is shown in FIG. 2. As shown in these drawings, the engine 1 has a cylinder block 2 that houses the cylinders 1a. Each cylinder 1a accommodates a piston. A cylinder head 4 is arranged on top of the cylinder block 2. A combustion chamber 5 is defined between each piston and the cylinder head 4. Four valves (first intake valve 6a, second intake valve 6b, and two exhaust valves 8) are provided for each cylinder 1a. The first intake valve 6a is connected with a first intake port 7a while the second intake valve 6b is connected with a second intake port 7b. Each exhaust valve 8 is connected with an exhaust port 9.

As shown in FIG. 2, the first intake port 7a is a helical port that extends in a helical manner. The second intake port 7b extends in a generally straight manner. Spark plugs 10 are arranged at the middle of the cylinder head 4. High voltage is applied to each spark plug 10 by an ignitor 12 through a distributor (not shown). The ignition timing of each spark plug 10 is determined by the output timing of the high voltage sent from the ignitor 12. A fuel injector 11 is arranged near the inner wall of the cylinder head at the vicinity of each set of first and second intake valves 6a, 6b. The fuel injector 11 is used to inject fuel directly into the associated cylinder 1a.

As shown in FIG. 1, the first and second intake ports 7a, 7b of each cylinder 1a are connected to a surge tank 16 by a first intake passage 15a and a second intake passage 15b, which are defined in an intake manifold 15. A swirl control valve 17 is arranged in each second intake passage 15b. The swirl control valves 17 are connected to, for example, a step motor 19 by a common shaft 18. The step motor 19 is controlled by signals sent from an electronic control unit (ECU) 30. The swirl control valves 17 may be driven by the pressure in the associated first and second intake ports 7a, 7b instead of by the stop rotor 19.

The surge tank 16 is connected to an air cleaner 21 through an intake duct 20. An electronically controlled throttle valve 23, which is opened and closed by a step motor 22, is arranged in the intake duct 20. The ECU 30 sends signals to drive the step motor 22 and open and close the throttle valve 23. The throttle valve 23 adjusts the amount of intake air that passes through the intake duct 20 and enters the combustion chambers 5.

A throttle sensor 25 is arranged in the vicinity of the throttle valve 23 to detect the opening angle (throttle angle TA) of the valve 23. The exhaust ports 9 of each, cylinder 1a are connected to an exhaust manifold 14. After combustion, the exhaust gas is sent to an exhaust duct (not shown) through the exhaust manifold 14.

A conventional exhaust gas recirculation (EGR) mechanism 51 recirculates some of the exhaust gas through an EGR passage 52. An EGR valve 53 is arranged in the EGR passage 52. The EGR passage 52 connects the downstream side of the throttle valve 23 in the intake duct 20 to the exhaust duct. The EGR valve 53 includes a valve seat, a valve body, and a step motor (none of which is shown). The opening area of the EGR valve 53 is altered by causing the step motor to intermittently displace the valve body with respect to the valve seat. When the EGR valve 53 opens, some of the exhaust gas sent into the exhaust duct 14a enters the EGR passage 52. The exhaust gas is then drawn into the intake duct 20 through the EGR valve 53. In other words, some of the exhaust gas is recirculated by the EGR mechanism 51 and returned to the air-fuel mixture. The recirculation amount of the exhaust gas (EGR amount) is adjusted by the opening amount of the EGR valve 53 (EGR valve opening EGRV).

The ECU 30 is a digital computer provided with a random access memory (RAM) 32, a read only memory (ROM) 33, a central processing unit (CPU) 34, which is a microprocessor, an input port 35, and an output port 36 that are connected to one another by a bidirectional bus 31.

An acceleration pedal 24 is connected to an acceleration sensor 26A. The acceleration sensor 26A generates voltage proportional to the depression degree of the acceleration pedal 24 and detects the acceleration pedal depression degree ACCP. The voltage output by the acceleration sensor 26A is input into the input port 35 by way of an analog to digital (A/D) converter 37. The acceleration pedal 24 is also provided with a complete closure switch 26B to detect when the pedal 24 is not depressed at all. The closure switch 26B outputs a complete closure signal of one when the acceleration pedal 24 is not depressed at all and outputs a complete closure signal of zero when the acceleration pedal 24 is depressed. The output voltage of the closure switch 26B is also input to the input port 35.

A top dead center position sensor 27 generates an output pulse when, for example, the piston in cylinder the first cylinder 1a reaches the top dead center position during the intake stroke. The output pulse is input to the input port 35. A crank angle sensor 28 generates an output pulse, which is input to the input port 35, each time a crankshaft of the engine 1 is rotated by a crank angle CA of 30 degrees. The CPU 34 reads the output pulses sent from the top dead center position sensor 27 and the crank angle sensor 28 to compute the engine speed NE.

The rotational angle of the shaft 18 is detected by a swirl control valve sensor 29 to measure the opening angle of the swirl control valves 17 (swirl control valve angle SCV). The signal output of the swirl control valve sensor 29 is input to the input port 35 by way of an A/D converter 37.

The throttle sensor 25 detects the throttle angle TA. The signal output of the throttle sensor 25 is input to the input port 35 by way of an A/D converter 37.

An intake pressure sensor 61 is provided to detect the pressure in the surge tank 16 (intake pressure PiM). A coolant temperature sensor 62 is provided in the engine 1 to detect the temperature of the engine coolant (coolant temperature THW). The signal outputs of the sensors 61, 62 are input to the input port 35 by way of A/D converters 37.

The operating conditions of the engine 1 are detected by the throttle sensor 25, the acceleration sensor 26A, the complete closure switch 26B, the top dead renter position sensor 27, the crank angle sensor 28, the swirl control valve sensor 29, the intake pressure sensor 61, and the coolant temperature sensor 62.

The output port 36 is connected to the fuel injectors 11, the step motors 19, 22, the igniter 12, and the step motor of the EGR valve 53 by way of drive circuits 38. The ECU 30 controls the fuel injectors 11, the step motors 19, 22, the ignitor 12, and the EGR valve 53 with control programs stored in the ROM 33 based on signals sent from the sensors 25–29 and 61–62.

Figure 3:
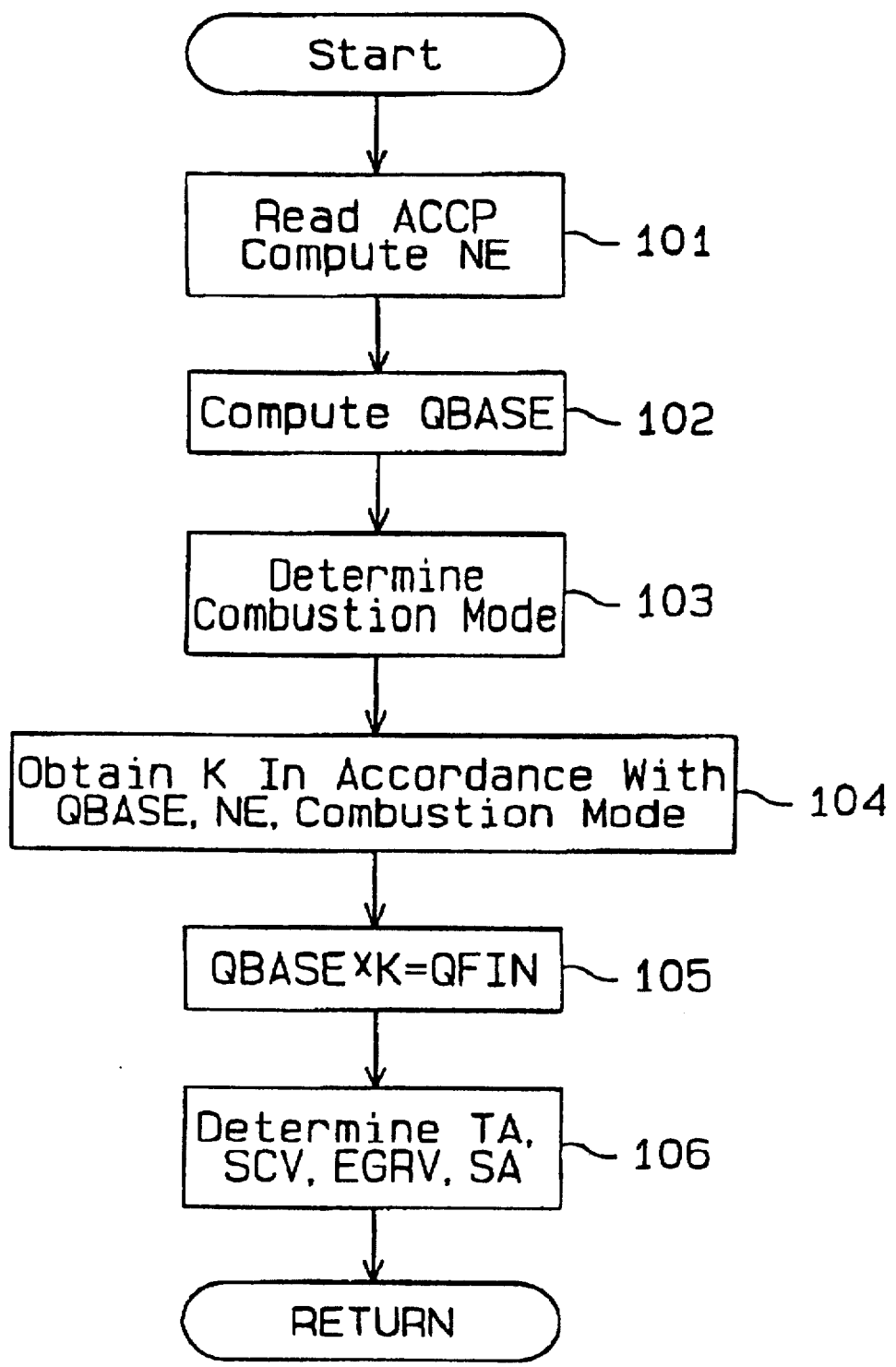
FIG. 3 is a flow chart showing a routine for determining the combustion mode and fuel injection amount.

A routine executed by the ECU 30 to control the amount of fuel injection is illustrated in the flow chart of FIG. 3. The ECU 30 executes this routine in an interrupting manner once for every predetermined crank angle.

When entering this routine, at step 101, the ECU 30 reads the signals that indicate the acceleration pedal depression degree ACCP. The ECU 30 also reads the signals sent front the top dead center position sensor 27 and the crank angle sensor 28 to compute the engine speed NE.

At step 102, the ECU 30 obtains the basic fuel injection amount QBASE from a basic fuel injection map (not shown) in accordance with the acceleration pedal depression degree ACCP and the engine speed NE.

Figure 4:
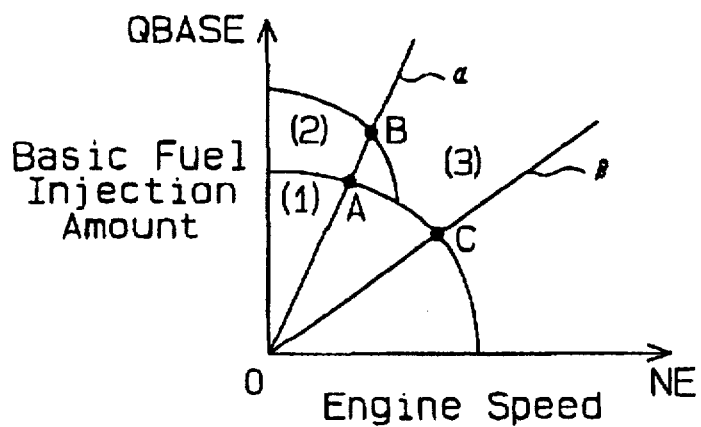
FIG. 4 is a graph showing a map used to determine the combustion mode.

At step 103, the ECU 30 determines the appropriate combustion mode corresponding to the basic fuel injection amount QBASE and the engine speed NE by referring to a map shown in FIG. 4. The combustion mode is selected from stratified charge combustion, semi-stratified charge combustion, and homogeneous charge combustion.

The map of FIG. 4 illustrates the appropriate combustion mode with respect to the basic fuel injection amount QBASE and the engine speed NE. In the map, the range indicated by (1) corresponds to stratified charge combustion. Range (1) is the area beneath the lower curve. The range indicated by (2) corresponds to semi-stratified charge combustion. Range (2) is the area between the upper and lower curves. The range indicated by (3) corresponds to homogeneous charge combustion. Range (3) is the area outside of areas (1) and (2). Each combustion mode range is determined based on the torque fluctuations produced in correspondence with the basic fuel injection amount QBASE.

When stratified charge combustion is selected, fuel is injected during the compression stroke. When homogeneous charge combustion is selected, fuel is injected during the intake stroke. When semi-stratified charge combustion is selected, fuel is injected twice, once during the compression stroke and once during the intake stroke.

In the map of FIG. 4, the lines denoted as α and β each show different patterns that appear when the basic fuel injection amount QBASE is increased or decreased in a proportional manner with respect to the engine speed NE. Line α represents a pattern in which the increasing ratio of the engine speed NE with respect to the engine load is small, such as when the automobile is climbing a slope. Line β represents a pattern in which the increasing ratio of the engine speed NE is greater than that of line α. In the pattern of line α (pattern α), stratified charge combustion is performed when the basic fuel injection amount QBASE is relatively small. As the basic fuel injection amount QBASE increases, the combustion mode is shifted to semi-stratified charge combustion and then to homogeneous charge combustion.

In the pattern of line β (pattern β) stratified charge combustion is performed when the basic fuel injection amount QBASE is relatively small. As the basic fuel injection amount QBASE increases, the combustion mode is shifted directly to homogenous charge combustion from stratified charge combustion. In other words, semi-stratified charge combustion is not performed.

Figure 5:
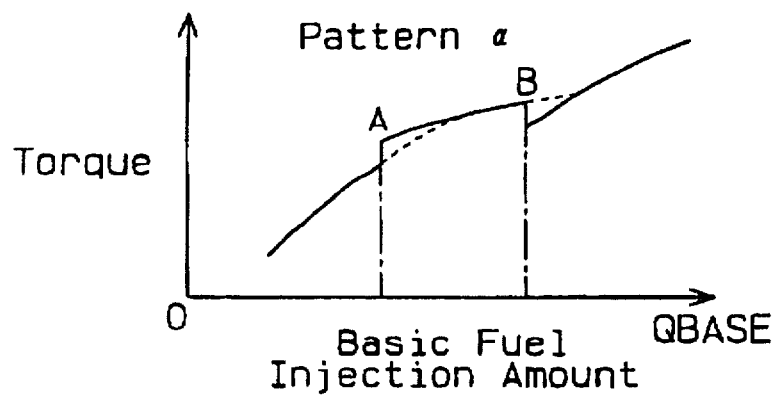
FIG. 5 is a graph showing the relationship between the fuel injection amount and the engine torque with respect to pattern $\alpha$ in the graph of FIG. 4.
Figure 6:
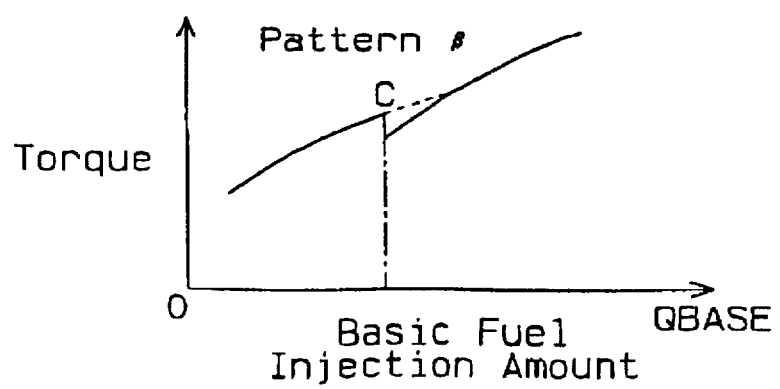
FIG. 6 is a graph showing the relationship between the fuel injection amount and the engine torque with respect to pattern $\beta$ in the graph of FIG. 4.

In both patterns α and β, when the combustion mode is switched in accordance with an increase or decrease in the basic fuel injection amount QBASE, a sudden torque fluctuation occurs as shown by the solid lines in the graphs of FIGS. 5 and 6.

The sudden torque decreases that occur at combustion mode shifting points B (FIG. 5) and C (FIG. 6) are caused by pumping losses resulting from sudden changes in the opening angle of the throttle valve 23 when shifting combustion modes.

The sudden torque increase that occurs at combustion mode shifting point A (FIG. 5) is caused by the slight difference that always exists between the basic fuel injection amount QBASE and the amount of fuel actually burned (actual fuel injection amount). Shifting of the combustion mode results in a sudden change in the difference between the basic fuel injection amount QBASE and the actual fuel injection amount. The sudden difference change may cause torque fluctuation. At shifting point A, the sudden change in the injection amount difference becomes greater than the influence of pumping loss and causes the sudden torque increase.

Figure 7:
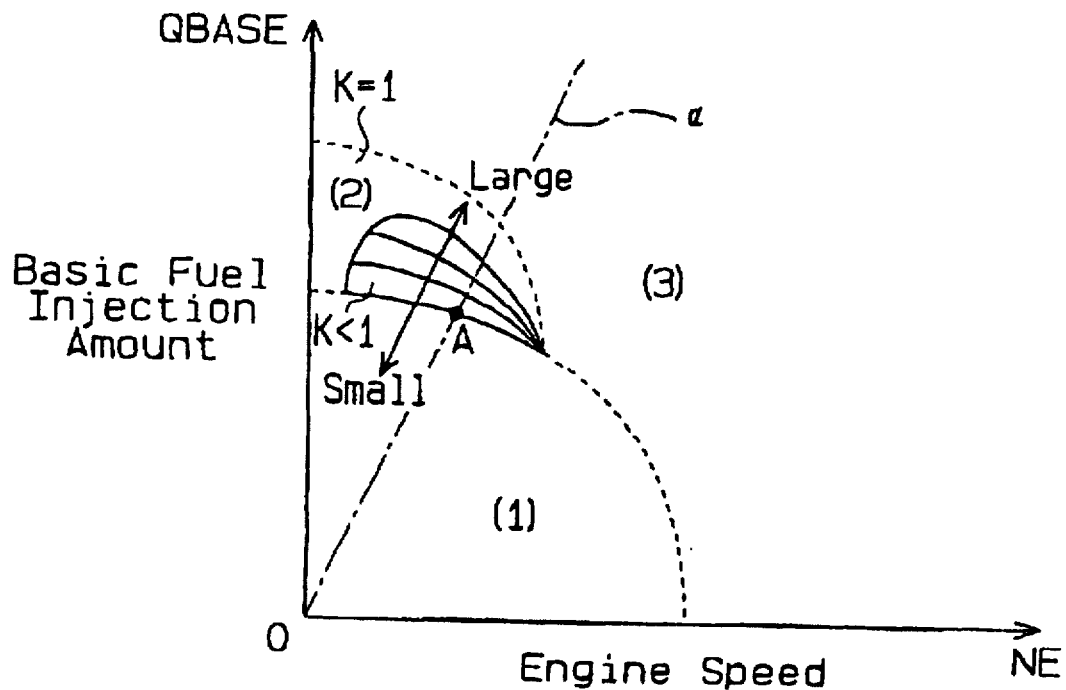
FIG. 7 is a graph showing a map used to determine a fuel injection correction coefficient K during semi-stratified charge combustion.
Figure 8:
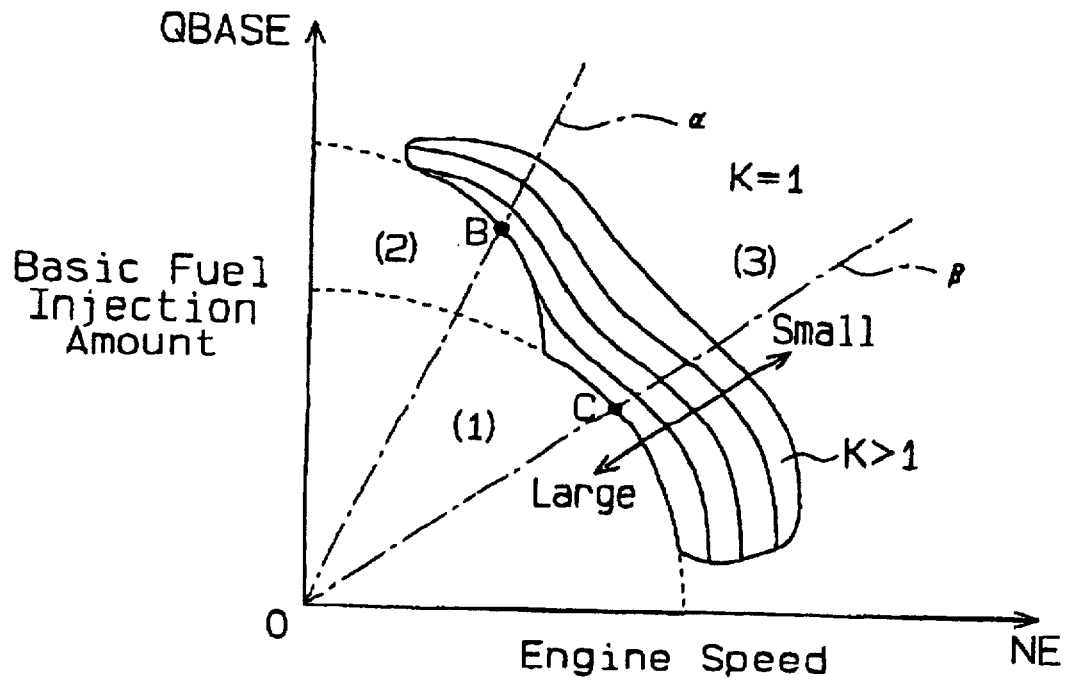
FIG. 8 is a graph showing a map used to determine the fuel injection correction coefficient K during homogeneous charge combustion.

The routine shown in the flow chart of FIG. 3 suppresses torque fluctuations during the shifting of combustion modes. The ECU 30 proceeds to step 104 from step 103 and obtains a fuel injection correction coefficient K based on the basic fuel injection amount QBASE and the engine speed NE. To obtain the fuel injection correction coefficient K, the ECU 30 refers to maps shown in FIGS. 7 and 8. The correction coefficient K is used to correct the basic fuel injection amount QBASE and reduce torque fluctuations that occur, especially when the combustion mode, or fuel injection mode, is shifted. Pumping losses and the difference between the basic fuel injection amount QBASE and the actual fuel injection amount are taken into consideration by the correction coefficient K. The map of FIG. 7 is referred to when semi-stratified charge combustion is performed, and the map of FIG. 8 is referred to when homogeneous charge combustion is performed. The correction coefficient K varies with respect to the basic fuel injection amount QBASE and the engine speed NE as shown in each map. The correction coefficient K differs between engines having different characteristics. In the preferred embodiment, the correction coefficient ranges from 0.95 to 1.20. The value of the correction coefficient K during stratified charge combustion is fixed at one. In other words, the fuel injection amount QBASE is not corrected when the stratified charge combustion is performed.

Like the map of FIG. 4, in the maps of FIG. 7 and 8, the range indicated by (1) corresponds to stratified charge combustion, the range indicated by (2) corresponds to semi-stratified charge combustion, and the range indicated by (3) corresponds to homogeneous charge combustion. The lines denoted by α and β correspond to patterns α and β shown in FIGS. 4 to 6. The maps of both FIGS. 7 and 8 show the relationship between the engine speed NE and the basic fuel injection amount QBASE with respect to the correction coefficient K during any given condition of the engine 1 in the associated combustion mode. Thus, the ECU 30 actually determines the correction coefficient K from the semi-stratified charge range (2) when referring to the map of FIG. 7, and from the homogeneous charge range (3) when referring to the map of FIG. 8.

When the basic fuel injection amount QBASE varies like pattern α, the correction coefficient K is determined in the following manner:

(a) When in the stratified charge combustion range (1), the correction coefficient K is fixed at the value of one and not corrected.

(b) When in the semi-stratified charge combustion range (2), the ECU 30 determines the correction coefficient K by referring to the map of FIG. 7. The value of the correction coefficient K is smaller than one. Thus, when the engine 1 shifts from stratified charge combustion to semi-stratified charge combustion at shifting point A, the basic fuel injection amount Q6ASE is corrected to a smaller value (FIG. 5).

(c) When in the homogeneous charge combustion range (2), the ECU 30 determines the correction coefficient K by referring to the map of FIG. 8. The value of the correction coefficient K is greater than one. Thus, when the engine 1 shifts from semi-stratified charge combustion to homogeneous charge combustion at shifting point B, the basic fuel injection amount QBASE is corrected to a larger value (FIG. 5).

If the basic fuel injection amount QBASE varies like pattern β, the correction coefficient K is determined in the same manner as pattern α. Therefore, as shown in FIG. 8, the basic fuel injection amount QBASE is corrected to a larger value when the engine 1 shifts from stratified charge combustion to homogeneous charge combustion at shifting point C (FIG. 6). The value of the correction coefficient K is larger at the boundary between the homogeneous charge combustion range (3) and the stratified charge combustion range (1) than the boundary between the homogeneous charge combustion range (3) and the semi-stratified charge combustion range (2). The correction coefficient K is smaller than one in the semi-stratified charge combustion range (2). Thus, the correction coefficient K corrects the basic fuel injection amount QBASE to a relatively large value when the engine 1 shifts from the stratified charge combustion mode (1) to the homogeneous charge combustion mode (3).

At step 105, the ECU 30 computes a target fuel injection amount QFIN by multiplying the current basic fuel injection amount QBASE with the fuel injection correction coefficient K. The ECU 30 then proceeds to step 106 and determines the throttle angle TA, the swirl control valve angle SCV, the EGR valve opening EGRV, and the ignition timing 5A. Afterwards, the ECU 30 terminates subsequent processing.

The target fuel injection amount QFIN, which is obtained by correcting the basic fuel injection amount QBASE with the correction coefficient K, suppresses sudden torque fluctuations during both pattern α and pattern β, as shown by the dotted line in FIGS. 5 and 6.

Accordingly, the preferred and illustrated embodiment prevents sudden torque fluctuations by correcting the basic fuel injection amount QBASE and adjusting the actual amount of fuel injection when shifting combustion modes.

The correction coefficient K for correcting the fuel injection amount is predetermined and not determined by feedback control. This effectively prevents torque fluctuations before they occur.

In the preferred and illustrated embodiment, torque fluctuations are suppressed by correcting the basic fuel injection amount QBASE. Thus, the combustion mode shifting point, which corresponds to the engine load and the operating conditions of the engine, is not altered. Thus, the optimal torque curve in correspondence with the combustion mode is achieved. This improves the driving performance of the engine.

It should be apparent to those skilled in the art that the present invention may be embodied in many other specific forms without departing from the spirit or scope of the invention. Particularly, it should be understood that the present invention may be embodied in the following forms.

The preferred and illustrated embodiment is applied to an engine 1 that injects fuel directly into the cylinders. However, the present invention may be applied to any other type of engine that shifts the combustion mode between stratified charge combustion and homogeneous charge combustion. For example, the present invention may be applied to an engine that injects fuel toward the stems of the valve heads of the intake valves 6a, 6b. In the preferred embodiment, each fuel injector 11 injects fuel near each set of first and second intake valves 6a, 6b. However, fuel injection may be carried out by employing injectors that inject fuel directly into the associated cylinder together with injectors that inject fuel outside the combustion chambers 5.

In the preferred and illustrated embodiment, helical type intake ports are employed to produce swirls. However, the swirls do not necessarily have to be produced. In such case, parts such as the swirl control valve 17 and the step motor 19 may be eliminated.

The preferred and illustrated embodiment is applied to a gasoline engine. However, the present invention may also be applied to other types of engines such as diesel engines.

Therefore, the present examples and embodiments are to be considered as illustrative and not restrictive and the invention is not to be limited to the details given herein, but may be modified within the scope and equivalence of the appended claims.

What is claimed:

1. An apparatus for controlling fuel injection according to a combustion mode of an engine selected from a combustion mode group including a stratified charge combustion mode and a homogeneous charge combustion mode, said apparatus comprising:

a nozzle for injecting fuel to an engine;

detecting means for detecting driving state of the engine;

first computing means for computing a basic amount of the injection fuel that is injected during an engine cycle from the nozzle based on the detected driving state of the engine;

switching means for switching the combustion mode based on the computed basic amount;

second computing means for computing a corrected amount of the injection fuel based on the basic amount of the injection fuel, said corrected amount of the injection fuel injected during an engine cycle suppressing a fluctuation of engine torque caused by switching of the combustion mode; and controlling means for controlling the nozzle based on the corrected amount of the injection fuel in synchronism with switching of the combustion mode.

2. The apparatus as set forth in claim 1, wherein said second computing means computes a correction value for computing the corrected amount of the injection fuel based on the basic amount of the injection fuel.

3. The apparatus as set forth in claim 2, wherein said second computing means selects "1" for the correction value when the engine operates in the stratified charge combustion mode, and wherein said second computing means sets a value larger than "1" as the correction value when the engine operates in the homogeneous charge combustion mode.

4. The apparatus as set forth in claim 3, wherein the nozzle injects the fuel in association with a compression stroke of a piston when the engine operates in the stratified charge combustion mode, and wherein the nozzle injects the fuel in association with a suction stroke of the piston when the engine operates in the homogeneous charge combustion mode.

5. The apparatus as set forth in claim 1, wherein said combustion mode group includes a semi-stratified charge combustion mode.

6. The apparatus as set forth in claim 5, wherein said second computing means computes a correction value for computing the corrected amount of the injection fuel based on the basic amount of the injection fuel and switched combustion mode.

7. The apparatus as set forth in claim 6, wherein said second computing moans selects "1" for the correction value when the engine operates in the stratified charge combustion mode, wherein said second computing means sets a value smaller than "1" as the correction value when the engine operates in the semi-stratified charge combustion mode, and wherein said second computing means sets a value larger than "1" as the correction value when the engine operates in the homogeneous charge combustion mode.

8. The apparatus as set forth in claim 7, wherein the nozzle injects the fuel in association with a compression stroke of a piston when the engine operates in the stratified charge combustion mode, wherein the nozzle injects the fuel in association with a suction stroke of the piston when the engine operates in the homogeneous charge combustion mode, and wherein the nozzle injects the fuel with dividing into two portions respectively in association with the compression stroke and the auction stroke of the piston when the engine operates in the semi-stratified charge combustion mode.

9. An apparatus for controlling fuel injection according to a combustion mode of an engine selected from a combustion mode group including a stratified charge combustion mode and a homogeneous charge combustion mode, said engine including an air intake passage for introducing air to a combustion chamber and a nozzle for injecting fuel to the combustion chamber, wherein said air that is introduced in the combustion chamber is controlled by a throttle valve that is located in the intake passage to adjust airflow in the intake passage, wherein said throttle valve is in an open position when the engine operates in the stratified charge combustion mode, and wherein said throttle valve is moved from the open position toward a closed position when the engine operates in the homogenous charge combustion mode, said apparatus comprising:

detecting means for detecting driving state of the engine;

first computing means for computing a basic amount of injection fuel to be injected during an engine cycle from the nozzle based on the detected driving state of the engine;

switching means for switching the combustion mode based on the detected driving state and the computed basic amount;

second computing means for computing a corrected amount of the injection fuel based on the basic amount of the injection fuel, said corrected amount of the injection fuel injected during an engine cycle suppressing a fluctuation of engine torque caused by switching of the combustion mode; and controlling means for controlling the injection valve based on said corrected amount of the injection fuel.

10. The apparatus as set forth in claim 9, wherein said second computing means computes the correction value based on the detected driving state of the engine and the computed basic amount of the fuel.

11. The apparatus as set forth in claim 9, wherein said combustion mode group includes a semi-stratified charge combustion mode, wherein the throttle valve is moved from open position toward the closed position up to the position corresponding to the homogeneous charge combustion mode.

12. The apparatus as set forth in claim 11, wherein said second computing means computes the correction value based on the detected driving state of the engine, the computed basic amount of the fuel, and switched combustion mode.

13. An apparatus for controlling fuel injection according to a combustion mode of a vehicle engine selected from a combustion mode group including a stratified charge combustion mode and a homogeneous charge combustion mode, said engine including an air intake passage for introducing air to a combustion chamber and a nozzle for injecting fuel to the combustion chamber, wherein said air that is introduced in the combustion chamber is controlled by a throttle valve disposed in the intake passage to adjust airflow in the intake passage, wherein said throttle valve is in an open position when the engine operates in the stratified charge combustion mode, and wherein said throttle valve is moved from the open position toward a closed position when the engine operates in the homogeneous charge combustion mode, said apparatus comprising:

detecting means for detecting driving state of the engine;

first computing means for computing a basic amount of injection fuel that is injected during an engine cycle from the nozzle based on the detected driving state of the engine;

selecting means for selecting the combustion mode based on the detected driving state, said selecting means including switching means for switching the combustion mode;

second computing means for computing a correction value that corrects the basic value of the injection fuel injected during an engine cycle to suppress a fluctuation of engine torque occurring when the combustion mode is switched, wherein said second computing means selects "1" for the correction value when the engine operates in the stratified charge combustion mode, and wherein said second computing means sets a value larger than "1" as the correction value when the engine operates in the homogeneous charge combustion mode; and controlling means for controlling the injection valve based on the correction value computed by the second computing means.

14. The apparatus as set forth in claim 13, wherein the nozzle injects the fuel in association with a compression stroke of a piston when the engine operates in the stratified charge combustion mode, and wherein the nozzle injects the fuel in association with a suction stroke of the piston when the engine operates in the homogeneous charge combustion mode.

15. An apparatus for controlling fuel injection according to a combustion mode of a vehicle engine selected from a combustion mode group including a stratified charge combustion mode and a homogeneous charge combustion mode, said engine including an air intake passage for introducing air to a combustion chamber and a nozzle for injecting fuel to the combustion chamber, wherein said air that is introduced in the combustion chamber is controlled by a throttle valve disposed in the intake passage to adjust airflow in the intake passage, wherein said throttle valve is in an open position when the engine operates in the stratified charge combustion mode, and wherein said throttle valve is moved from the open position toward a closed position when the engine operates in the homogeneous charge combustion mode, said apparatus comprising:

detecting means for detecting driving state of the engine;

first computing means for computing a basic amount of injection fuel that is injected during an engine cycle from the nozzle based on the detected driving state of the engine;

selecting means for selecting the combustion mode based on the detected driving state and, said selecting means including switching means for switching the combustion mode;

second computing means for computing a correction value that corrects the basic value of the injection fuel injected during an engine cycle to suppress a fluctuation of engine torque occurring when the combustion mode is switched, wherein said second computing means selects "1" for the correction value when the engine operates in the stratified charge combustion mode, wherein said second computing means sets a value smaller than "1" as the correction value when the engine operates in the semi-stratified charge combustion mode, and wherein said second computing means sets a value larger than "1" as the correction value when the engine operates in the homogeneous charge combustion mode; and controlling means for controlling the injection valve based on the correction value computed by the second computing means.

16. The apparatus as set forth in claim 15, wherein the nozzle injects the fuel in association with a compression stroke of a piston when the engine operates in the stratified charge combustion mode, wherein the nozzle injects the fuel in association with a suction stroke of the piston when the engine operates in the homogeneous charge combustion mode, and wherein the nozzle injects the fuel with dividing into two portions respectively in association with the compression stroke and the suction stroke of the piston when the engine operates in the semi-stratified charge combustion mode.

* * * * *